H = HORIZONTALLY POLARIZED WAVES
V = VERTICALLY POLARIZED WAVES
RH = RIGHT HAND POLARIZED WAVES
LH = LEFT HAND POLARIZED WAVES

United States Patent Office 3,271,771
Patented Sept. 6, 1966

3,271,771
DOUBLE-REFLECTOR, DOUBLE-FEED ANTENNA FOR CROSSED POLARIZATIONS AND POLARIZATION CHANGING DEVICES USEFUL THEREIN
Peter W. Hannan, Northport, and Harold A. Wheeler, Great Neck, N.Y., assignors to Hazeltine Research Inc., a corporation of Illinois
Filed Feb. 15, 1962, Ser. No. 173,501
13 Claims. (Cl. 343—756)

This invention relates to antennas having two feeds cooperating with a subreflector and a main reflector, and to polarization changing devices useful in these and other applications. More particularly, such antennas may have one feed designed for waves of a given polarization and frequency and the other feed designed for waves of a different polarization and the same or a different frequency.

Many microwave antennas are similar to optical searchlights and telescopes. A common form of microwave antenna consists of a single large reflecting dish and a small microwave feed such as a horn or a dipole array. The reflector has a parabolic contour, and the feed is located at the focus of the parabola. During transmission, the feed radiates a divergent wave which is collimated by the reflector into a plane wave; during reception, the reverse occurs. In optical telescopes and searchlights employing a single curved reflecting mirror, a similar action takes place. In certain optical telescopes the Cassegrain double-reflector system has been utilized. Compared with the single-reflector type, it achieves a high magnification with a short focal length, and allows a convenient rear location for the observer. Recently, a number of microwave antennas have been developed which employ double-reflector systems similar to that of the Cassegrain telescope.

A Cassegrain telescope consists of two mirrors and an observing optical instrument. The primary mirror, which is a large concave mirror in the rear, collects the incoming light and reflects it toward the secondary mirror, which is a small convex mirror out in front. The secondary mirror then reflects the light back through a hole in the center of the primary mirror. When the incoming rays of light are parallel to the telescope axis, the final bundle of light rays is focused toward a point; at this location the observer places his eye or his camera.

In the basic microwave antenna derived from the Cassegrain telescope, the microwave reflectors, which will be called the main reflector and the subreflector, have surfaces similar in shape to those of the telescope. The microwave feed is a small antenna which, together with a transmitter or receiver, replaces the optical instrument of the telescope.

Analysis of the operation of a Cassegrain antenna system may be performed with the same semi-optical approximation commonly employed with an ordinary single-reflector antenna. Usually the feed is sufficiently small so that the wave radiated by the feed can be described by the far-field pattern of the feed before reaching the subreflector, and the wave incident on the subreflector appears to travel along the rays originating from a point centered on the feed. The subreflector, which must be large enough to intercept the useful portion of the feed radiation, ordinarily reflects this wave essentially according to ray optics. On reaching the main reflector, the wave is again reflected according to ray optics, and, because of the geometry of the antenna elements, the rays emerge parallel and the wavefront has the flat shape which is usually desired.

The geometry of the Cassegrain system is simple and well-known. The classical Cassegrain geometry employs a parabolic contour for the main reflector and a hyperbolic contour for the subreflector. One of the two foci of the hyperbola is the real focal point of the system, and is located at the center of the feed; the other is a virtual focal point which is located at the focus of the parabola. As a result, all parts of a wave originating at the real focal point, and then reflected from both surfaces, travel equal distances to a plane in front of the antenna. The invention is also applicable to variations of the classical Cassegrain system, including variations which resemble classical Gregorian telescopes.

In a microwave antenna of the focusing type, it is sometimes desired to operate in two distinct channels, each having a different polarization. One arrangement to achieve this involves two complete antennas. This is expensive and objectionable in view of the large size of the complete system. Another method employs a single reflector and two closely-spaced or coincident feeds, each feed operating on a different polarization; this severely restricts the design of the feeds, and is also subject to spurious coupling between the feeds. An ordinary double-reflector system would also have these defects, because the two feeds would be located together in the region of the real focal point. Hence, prior art systems are not entirely satisfactory for dual-polarization applications.

In a double-reflector antenna, there may be two separate focal points which can be arranged to be located in front of the main reflector on opposite sides of the subreflector. If one feed is located at the real focus and the other at the virtual focus, the design of each feed is independent of the other. Furthermore, their physical separation may reduce spurious coupling between the feeds. Thus, the use of both focal points makes possible great flexibility and other advantages; however, these advantages have not been practically achievable in the prior art.

This specification is written in terms of "circular" (left-hand and right-hand) and "linear" (vertical and horizontal) polarizations for purposes of clarity and because such polarizations are presently considered the most useful. However, the invention is equally applicable to any desired elliptical set of orthogonal polarizations and in the claims, the word "elliptical" can be substituted for any occurrence of any or all of the words "circular," "vertical," "horizontal" and "linear" in order to apply the invention to elliptically polarized waves of other than the limiting cases of linear or circular polarization. While the statement of the preceding sentence is considered so obvious to those skilled in the art as to not be required, the statement is included to avoid any possible misunderstanding as to the scope of the claims. The specification should be read keeping in mind that the concepts involved apply to waves of any eliptical polarization.

It is an object of this invention, therefore, to provide new polarization changing devices and new and improved antennas which use such devices to avoid one or more of the disadvantages of prior art antennas.

It is a further object of this invention to provide double-reflector antennas including two feeds, each for a different wave polarization.

It is an additional object of this invention to provide double-reflector, double-feed antennas, wherein the subreflector is a grid which reflects one polarization and transmits a different polarization.

It is an additional object of this invention to provide devices for changing the polarizations of transmitted and reflected incident waves.

For a better understanding of the present invention, together with other and further objects thereof, reference is had to the following description taken in connection with the accompanying drawings, and its scope will be pointed out in the appended claims.

Figure 3:
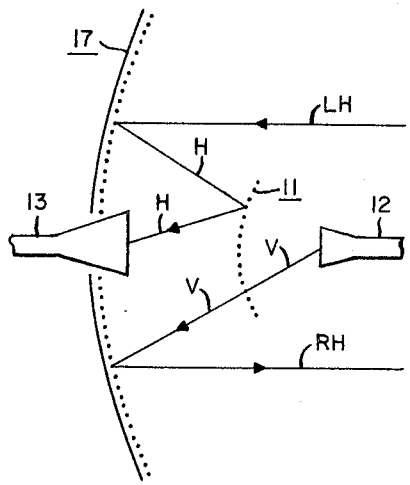
FIGS. 3 and 4 are schematic cross-sections of two different types of double-reflector, double-feed antennas for radiating waves of one circular polarization and receiving waves of the opposite polarization but having feeds operating with different linear polarizations.
Figure 6:
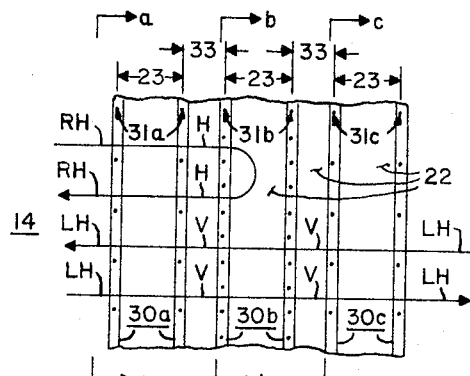
FIG. 6 is a sectional view of a subreflector, suitable for use in the FIG. 2 antenna, which transmits waves of right-hand circular polarization and reflects waves of left-hand circular polarization.
Figure 6A:
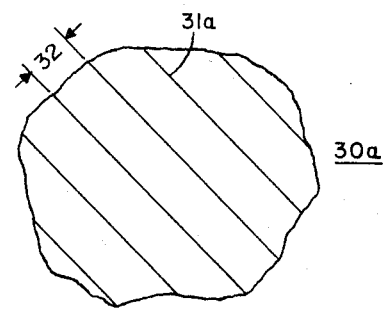
Figure 6B:
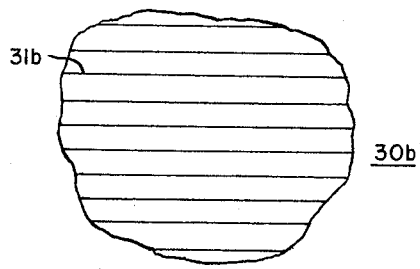
Figure 7:
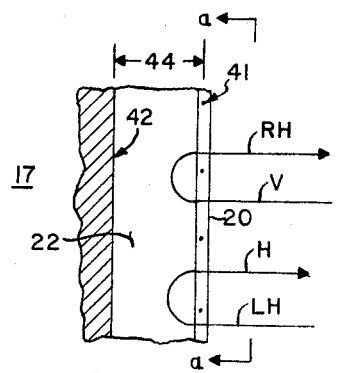
Figure 7A:
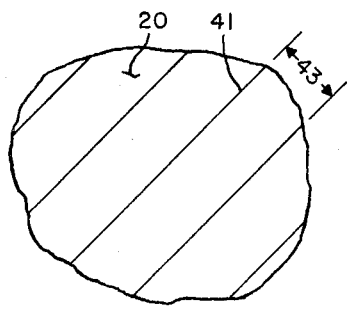
Figure 8:
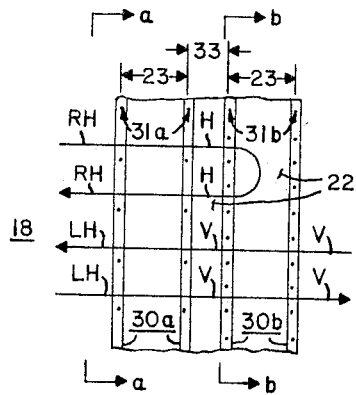
Figure 8A:
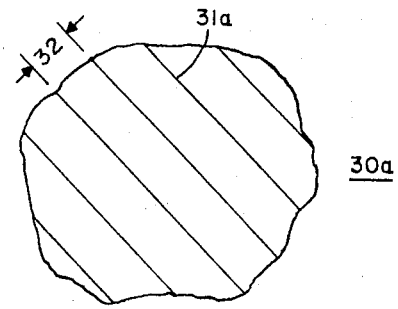
Figure 8B:
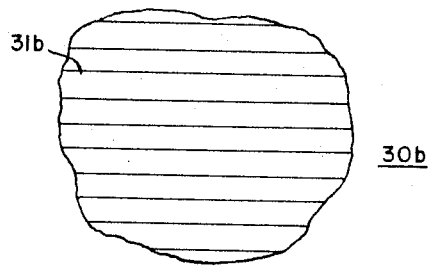
Figure 9:
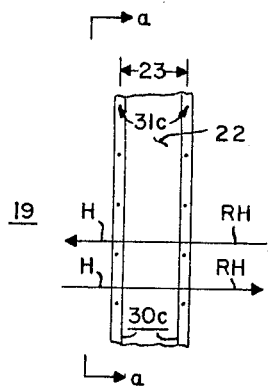
Figure 9A:
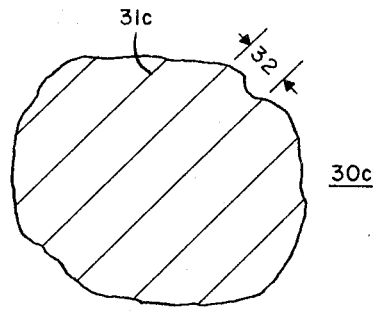

FIGS. 6a, 6b ann 6c are views of the subreflector of FIG. 6 taken at aa, bb and cc respectively;

FIG. 7 is a sectional view of a main reflector, suitable for use in the FIG. 3 antenna, which reflects an incident wave with a change in polarization; a vertically polarized wave being changed to right-hand circular polarization and vice versa, and a horizontally polarized wave being changed to left-hand circular polarization and vice versa;

FIG. 7a is a view of the subreflector of FIG. 7 taken at aa;

FIG. 8 is a sectional view of a subreflector which transmits waves with a change from a given circular to a linear polarization and vice versa, but which reflects without change, waves of a different circular polarization;

FIGS. 8a and 8b are views of the subreflector of FIG. 8 taken at aa and bb respectively;

FIG. 9 is a sectional view of a screen which transmits waves with a change from circular to linear polarization and vice versa; and FIG. 9a is a view of the subreflector of FIG. 9 taken at aa.

Figure 1:
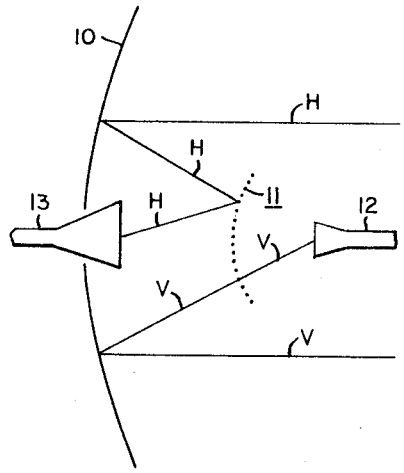
FIG. 1 is a schematic cross-section of a double-reflector, double-feed antenna for horizontal and vertical polarizations in accordance with the invention.

FIG. 1.—Antenna system

Referring to FIG. 1 of the drawings, there is shown a double-reflector, double-feed antenna, including a main reflector 10 and subreflector means 11, cooperating with the main reflector for transmitting waves of one polarization and reflecting waves of a different polarization. The antenna also includes first feed means 12, positioned for processing waves which are transmitted by the subreflector and second feed means 13, positioned for processing waves which are reflected by the subreflector.

In greater particularity, the subreflector 11 of FIG. 1 is coaxial with the main reflector 10 and positioned away from the main reflector so as to cooperate with it in focusing waves into the feed 13. Subreflector 11 is in the form of a grid which, in this example, transmits vertically polarized waves and reflects horizontally polarized waves. The actual construction of such a grid will be described in more detail below. The first feed 12 in FIG. 1 is designed to operate with vertically polarized waves (see the wave paths indicated in FIG. 1). This feed 12 is coaxial with and spaced from the subreflector 11 on the side of the subreflector opposite the main reflector 10. Feed 12 is positioned at approximately the focal point of main reflector 10 and cooperates with the main reflector in well-known manner substantially independently of the subreflector 11, which is transparent to vertically polarized waves. The second feed 13 is designed to operate with horizontally polarized waves, and is coaxial with and spaced from the subreflector 11 on the same side of the subreflector as the main reflector.

Feed 13 is positioned at approximately the real focal point of the combination of subreflector 11 and the main reflector 10 and cooperates with the combination of the main reflector 10 and the subreflector 11 in the manner of prior art Cassegrain or other double-reflector antennas.

It should now be appreciated that the two feeds 12 and 13 both use the same main aperture provided by the main reflector 10, but that each operates substantially independently of and in isolation from the other. It should further be appreciated that the frequencies at which the two feeds operate have not been mentioned. The two feeds may operate at the same or at different frequencies in this arrangement and are still isolated from each other as a result of the difference in their polarizations and because of their physical separation. Each feed may be designed for best performance without compromising for the presence of the other; in fact, if desired, one feed may be a completely different design from the other.

Figure 2:
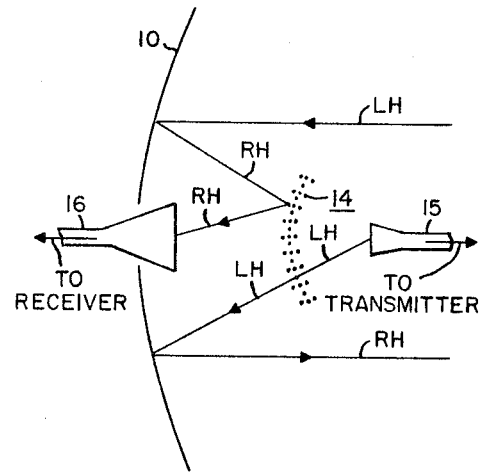
FIG. 2 is a schematic cross-section of a double-reflector double-feed antenna including a transmitter of one circular polarization and a receiver of the opposite circular polarization.

FIG. 2.—Antenna system

Referring now to FIG. 2 there is shown a radar antenna designed to radiate waves of right-hand circular polarization, and to receive return signals which have undergone the well-known circular polarization reversing action in reflection from a target. The feed 15 is connected to the transmitter while the feed 16 is connected to the receiver; each feed has the proper sense of circular polarization for its particular function.

In this arrangement, waves radiated with left-hand circular polarization by feed 15 are passed through the subreflector 14, which is substantially transparent for waves of left-hand polarization. After undergoing a polarization reversal, upon reflection by the main reflector 10, these waves are radiated into space as right-hand circularly polarized waves. Upon reflection by a radar target, the polarization of these waves is reversed from right-hand to left-hand. These return waves, upon reflection by the main reflector 10, undergo an additional reversing action and are changed to right-hand circularly polarized waves, which are reflected by the subreflector 14 without any reversing action, and coupled into the receiving feed 16. No reversing action takes place in the reflection from subreflector 14 because of the inherent properties of a surface design which transmits left-hand polarized waves and reflects right-hand polarized waves.

This antenna arrangement allows convenient separation of the transmitting and receiving functions in such a radar system without the need for complex duplexing arrangements normally required to separate incoming and outgoing signals. The antenna arrangement is, of course, also applicable to systems requiring operation separately with right and left-hand circular polarizations. In either case, the arrangement enables the two feeds to be designed and operated separately.

FIG. 3.—Antenna system

Referring now to FIG. 3 there is shown an antenna which has the same capabilities as that of FIG. 2. However, in this arrangement the feeds are linearly polarized, and the subreflector is transparent to a vertically polarized wave and reflects a horizontally polarized wave, as in FIG. 1. The main reflector 17 incorporates a device which changes a linearly polarized wave to a circularly polarized wave, and vice versa, resulting in an antenna which operates separately in both types of circular polarization. This arrangement has the advantage, compared with the FIG. 2 arrangement, of a relatively simple subreflector design and the wideband performance available when the circular-polarizing grid is located on the completely reflecting main reflector; it has the disadvantage of requiring the construction of a grating over the relatively large main reflector.

Figure 4:
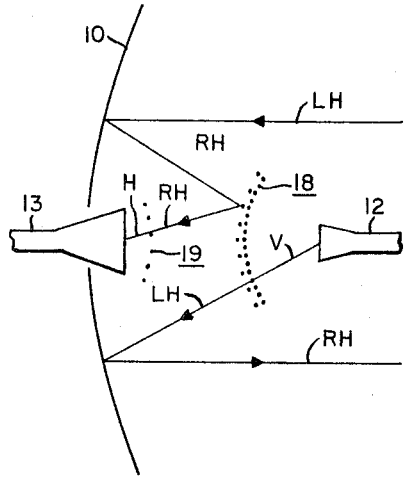

FIG. 4.—Antenna system

With reference now to FIG. 4, there is shown an antenna which provides capabilities similar to those of FIGS. 2 and 3, but which avoids the disadvantages of feeds operating with circular polarization or construction of a grating covering the large main reflector. Subreflector 18 converts a wave of left-hand circular polarization to vertical polarization and vice versa; but reflects without change waves of right-hand circular polarization. Polarization changing screen 19 converts waves of right-hand circular polarization to horizontal polarization and vice versa.

Figure 5:
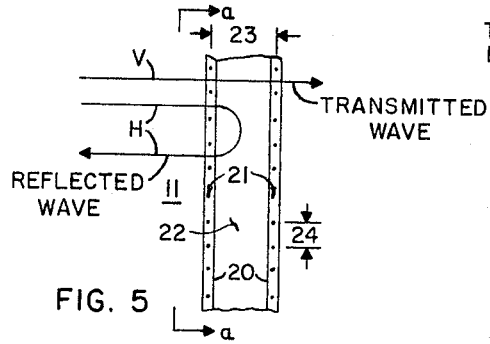
FIG. 5 is a sectional view of a subreflector, suitable for use in the FIG. 1 and FIG. 3 antennas, which transmits vertically polarized waves and reflects horizontally polarized waves.

FIG. 5.—Subreflector

Referring now to FIG. 5, there is illustrated a section of a subreflector, in the form of a dielectrically supported grid of parallel conductors, which may be used in accordance with the invention shown in FIG. 1 and FIG. 3. As shown in FIG. 5 the subreflector 11, in this example, is made up of two thin Fiberglas skins 20, each of which encloses a grid 21, of parallel thin metallic wires. The wire grid provides the essential electrical operation, while the skin serves to hold the wires in place. The wire spacing 24 is very small compared with a wave length. The skins 20 are supported and spaced from each other by a relatively low dielectric constant honeycomb material 22, whose thickness is such that the two grids 21 are effectively separated from each other (dimension 23) by approximately one quarter of the effective operating wave length. The term "effective operating wave length" refers to the actual wave length of a single frequency system or the average mid-band wave length over an operating frequency bandwidth divided by the average cosine of the angles of incidence of the wave on the subreflector surface.

Figure 5A:
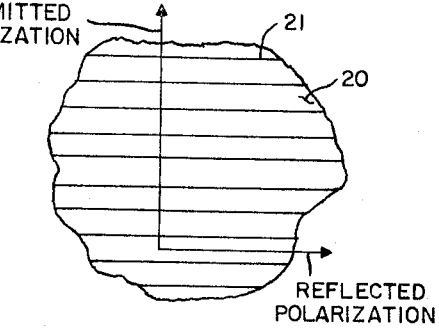
FIG. 5a is a view of the subreflector of FIG. 5 taken at aa.

A subreflector constructed in this manner has the property of being essentially a perfect reflector for waves polarized in the direction parallel to the conductors, as shown by the arrow labelled "reflected polarization" in FIG. 5a, and being essentially invisible to waves polarized in the direction perpendicular to the conductors, as indicated by the arrow labelled "transmitted polarization." In other arrangements, wires may all be placed in one skin; putting the wires in one skin or dividing them equally between two skins, as shown, yields comparable results. There are also alternate constructions involving metal slats or other elements in place of the metal wires which will be evident to those skilled in this art.

FIG. 6.—Subreflector

Figure 6C:
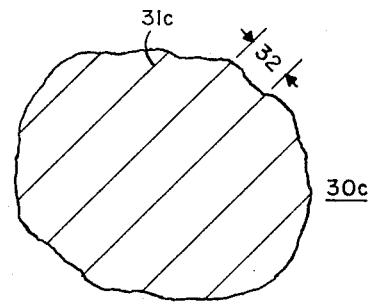

Referring now to FIG. 6, there is illustrated a polarization sensitive device shown as a section of a subreflector, in the form of a dielectrically supported series of grids of conductors, which may be used in accordance with the invention as shown in FIG. 2. As shown in FIG. 6, the subreflector 14 in this example is made up of six thin Fiberglas skins 30, each of which encloses a grid 31, of parallel thin metallic wires. The center two grids 31b, are identical and are shown in FIG. 6b, as comprising horizontal conductors; the dimensions are essentially the same as those given in FIG. 5. The pair of grids 31a, as shown in FIG. 6a, comprise conductors which are oriented at 45° to the conductors of center grids 31b and the diameter of wires of the grids 31a and spacings 23a of these wires is such that an incident wave which is linearly polarized parallel to the wires would be transmitted through with a quarter wave phase advance compared with a perpendicularly polarized wave. (FIGS. 6a, 6b, and 6c, are sectional views of FIG. 6 and their orientation is indicated by the section arrows in FIG. 6 per standard drafting practice; this is true for FIGS. 7 and 8 and their sectional views also.) The pair of grids 31c, as shown in FIG. 6c, are constructed similarly to the grids 31a, but the conductors of these grids are oriented at 45° to the conductors of the center grids 31b, in the opposite direction to the conductors of grids 31a. The skins 30 are supported and spaced from each other by a relatively low dielectric constant honeycomb material 22, whose thickness is such that each pair of similar grids is effectively separated (dimension 23) by approximately one quarter of the effective operating wavelength. The spacing 33 between adjacent grids of different types is relatively unimportant.

A subreflector constructed in this manner has the property of being essentially a complete reflector for waves of right-hand circular polarization and being essentially invisible to waves of left-hand circular polarization, as shown by the arrows in FIG. 6. With the design shown in FIG. 6, the pair of grids 31a (on the left) changes a circularly polarized wave to a linearly polarized wave, or vice versa, and the pair 31c (on the right) do the same. In optics, these devices would be called "quarter-wave plates." The pair of grids 31b (in the center) transmit or reflect a linearly polarized wave according to its polarization. By combining these devices as shown, the complete structure achieves polarization-sensitive properties. In other arrangements, there may be more or fewer grids, and the grid spacings and wire orientations may be different. There are alternate constructions involving metal and dielectric slats or other elements in place of the metal wires which will be apparent to those skilled in the art. In the subreflector design shown in FIG. 6, it is also possible to orient the pair of grids on the right (31c) in the same direction as those on the left (31a): in this case the feed 15 in FIG. 2 should operate with right-hand circular polarization, but the benefits will be similar. Another possible modification to the FIG. 5 design involves the elimination of the pair of grids on the right: in this case the feed 15 in FIG. 2 should operate with vertical polarization, but the benefits will be similar.

FIG. 7.—Reflector

Referring now to FIG. 7, there is illustrated a section of the main reflector 17, in the form of a metal surface and a dielectrically supported grid of parallel conductors, which may be used in accordance with the invention as shown in FIG. 3. As shown in FIG. 7, the main reflector 17 in this example includes a grid 41 of parallel thin metallic wires and a solid metal reflecting surface 42. The wires of the grid 41 are oriented at 45° to the horizontal as shown in FIG. 7a, and the diameter of wires of grid 41 and the spacing 43 is such that about ⅚ of the power of an incident wave polarized parallel to the wires would pass through. The wires are enclosed in a thin Fiberglas skin 20 which is supported and spaced from the metal surface by a relatively low dielectric constant honeycomb material 22, whose thickness is such that the wire grid 41 is effectively separated (dimension 44) from the metal surface by approximately 3/11 of the effective operating wavelength.

A main reflector constructed in this manner has the property of reflecting an incident wave and changing its polarization from vertical to right-hand circular, or from left-hand circular to horizontal. Furthermore, the specific design described has the feature of operating over a wide band of frequencies and over a wide range of incidence angles in both planes of incidence. This design is analogous to the wideband wide-angle polarization twisting and reflecting design described in applicants' applications Serial No. 80,961, filed January 5, 1961, entitled "Twistreflector," now Patent No. 3,161,879 and Serial No. 94,513, filed March 9, 1961, entitled "Double-Reflector Antenna With Polarization Changing Subreflector." In other arrangements more grids can be included or metal or dielectric slats or other elements can be used in place of the metal wires as will be evident to those skilled in this art.

FIGS. 8 and 9

FIG. 8 shows a section of a subreflector which may be used in accordance with the invention as shown in FIG. 4. The subreflector of FIG. 8 is of construction identical to the subreflector of FIG. 6 with the two grids 31c (and supporting dielectric skin 30c and dielectric 22) of FIG. 6 cut away. Therefore, no detailed description of the FIG. 8 subreflector is necessary. Reference to the discussion of FIG. 6 will explain how subreflector means 18 is effective to reflect right-hand circularly polarized waves, while transmitting left-hand circularly polarized waves with a change in polarization from left-hand circular to vertical (and vice versa).

FIG. 9 shows a section of a polarization changing screen in the form of two special skin-supported grids. This screen 19 which may be used in accordance with the invention as shown in FIG. 4, is of construction identical to the two grids 31c (with supporting dielectric skin 30c and dielectric 22) of FIG. 6. Reference to the description of FIG. 6 will explain how screen 19 is effective to change right-hand circularly polarized waves to horizontally polarized waves and vice versa.

With regard to all the antenna configurations and surface designs shown, it should be appreciated that specific polarizations and orientations were chosen for simplicity of presentation. The same principles are applicable to other polarizations; for example, in FIG. 1 the feed 13 could be vertically polarized and the feed 12 horizontally polarized, and subreflector 11, shown in FIG. 3 could have a grid of vertical wires without departing from the concepts of the invention as described.

In arrangements in accordance with the invention the subreflector may block part of the main aperture for one or both polarizations. This blocking can be minimized by design in accordance with the teaching of the applicants' application Serial No. 92,504, filed March 1, 1961, and entitled "Double Reflector Antenna With Minimum Aperture Blocking," now Patent No. 3,218,643.

The present invention facilitates independent design of the two feeds, which are effectively shielded from each other. The invention can be used for two separate radars with different polarization utilizing the same aperture. It is also directly applicable to the common desire to have radar and a beacon or transponder, such as used in IFF (Identification Friend or Foe) systems, operate with the same aperture.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A double-reflector double-feed antenna for radiating signals of a first circular polarization and receiving return signals which have undergone circular polarization reversing action in reflection from an object comprising:
a main reflector;
subreflector means cooperating with said main reflector which is substantially transparent for waves of a first circular polarization and which reflects waves of the opposite circular polarization;
a first feed for waves of said first polarization cooperating with said main reflector substantially independently of said subreflector means;
and a second feed for waves of said opposite polarization cooperating with the combination of said main reflector and subreflector means.

2. A double-reflector double-feed antenna comprising:
a main reflector;
subreflector means spaced from said main reflector for transmitting waves of a first circular polarization and reflecting waves of a second circular polarization, said transmitted waves being converted to a first linear polarization during transmission and vice versa;
a first feed for waves of said first linear polarization, spaced from said subreflector means on the side opposite said main reflector;
and a second feed for said reflected waves, spaced from said subreflector means on the same side as said main reflector.

3. A double-reflector double-feed antenna comprising:
a main reflector;
subreflector means spaced from said main reflector for transmitting waves of a first circular polarization and reflecting waves of a second circular polarization, said transmitted waves being converted to a first linear polarization during transmission and vice versa;
a first feed for waves of said first linear polarization, spaced from said subreflector means on the side opposite said main reflector;
a second feed for waves of a second linear polarization, spaced from said subreflector means on the same side as said main reflector;
and a polarization changing screen spaced between said subreflector and said second feed for converting waves of said second circular polarization to said second linear polarization and vice versa.

4. A polarization sensitive device comprising:
a first group of dielectrically supported conductors arranged for converting circularly polarized waves to linearly polarized waves and vice versa, incident waves of one circular polarization being converted to a first linear polarization and incident waves of the opposite circular polarization being converted to a second linear polarization and vice versa;
a second group of dielectrically supported conductors coupled to said first group and arranged for reflecting waves of said first linear polarization back to said first group of conductors and passing waves of said second linear polarization;
the complete device being so constructed and arranged that in operation, incident waves of one circular polarization are reflected and incident waves of the opposite circular polarization are transmitted as linearly polarized waves.

5. A polarization sensitive subreflector comprising:
a first group of dielectrically supported conductors arranged for converting circularly polarized waves to linearly polarized waves and vice versa, incident waves of one circular polarization being converted to a first linear polarization and incident waves of the opposite circular polarization being converted to a second linear polarization and vice versa;
a second group of dielectrically supported conductors coupled to said first group and arranged for reflecting waves of said first linear polarization back to said first group of conductors and passing waves of said second linear polarization;
the two means being arranged to form a subreflector which reflects and focuses incident waves of one circular polarization, while incident waves of the opposite circular polarization are transmitted as linearly polarized waves.

6. A polarization-changing reflector comprising:
a reflecting surface for electromagnetic waves;
a grid of parallel thin metallic wires having a diameter and spacing such that approximately 83.6% of the power of an incident wave polarized parallel to the wires passes through;
a thin dielectric skin enclosing said wires;
and a low dielectric constant material supporting said dielectric skin with a spacing of approximately 27.4% of the effective operating wavelength between the wires and the reflecting surface;
so that an incident wave of a first circular polarization is reflected as a wave of a first linear polarization and an incident wave of the opposite circular polarization is reflected as a wave of a second linear polarization and vice versa, over a wide range of frequency and incidence angle.

7. A double-reflector double-feed antenna of the type described in claim 1, wherein the subreflector means comprises:
   first means for converting circularly polarized electromagnetic waves to linearly polarized waves and vice versa, incident waves of one circular polarization being converted to a first linear polarization and incident waves of the opposite circular polarization being converted to a second linear polarization and vice versa;
   second means coupled to said first means for reflecting waves of said first linear polarization and passing waves of said second linear polarization;
   and third means coupled to said second means for providing the same functions as said first means;
   so that in operation incident waves of one circular polarization are reflected and incident waves of the opposite circular polarization are transmitted by the complete device.

8. A double-reflector double-feed antenna of the type described in claim 2, wherein the subreflector means comprises:
   a first group of dielectrically supported conductors arranged for converting circularly polarized waves to linearly polarized waves and vice versa, incident waves of one circular polarization being converted to a first linear polarization and incident waves of the opposite circular polarization being converted to a second linear polarization and vice versa;
   and a second group of dielectrically supported conductors coupled to said first group and arranged for reflecting waves of said first linear polarization and passing waves of said second linear polarization;
   the complete device being so constructed and arranged that in operation, incident waves of one circular polarization are reflected and incident waves of the opposite circular polarization are transmitted as linearly polarized waves.

9. A polarization sensitive device comprising:
   a first group of dielectrically supported conductors arranged for converting circularly polarized electromagnetic waves to linearly polarized waves and vice versa, incident waves of one circular polarization being converted to a first linear polarization and incident waves of the opposite circular polarization being converted to a second linear polarization and vice versa;
   a second group of dielectrically supported conductors coupled to said first group and arranged for reflecting waves of said first linear polarization and passing waves of said second linear polarization;
   and a third group of dielectrically supported conductors coupled to said second group and arranged for providing the same functions as said first group;
   so that in operation incident waves of one circular polarization are reflected and incident waves of the opposite circular polarization are transmitted by the complete device.

10. A polarization sensitive device of the type described in claim 9, wherein the first and third groups of dielectrically supported conductors each comprise:
    a first grid of substantially parallel conductors supported in a dielectric skin;
    a second grid of substantially parallel conductors supported in a dielectric skin and substantially identical to said first grid;
    and means having a dielectric constant lower than that of said skins for spacing said first and second grids approximately one-quarter of the effective operating wavelength apart;
    the first and third means each being so constructed and arranged that an incident wave which is linearly polarized parallel to the conductors will be transmitted through the device with a quarter wave phase advance compared to a perpendicularly polarized wave.

11. A polarization sensitive device of the type described in claim 4, wherein the first group of dielectrically supported conductors comprises:
    a first grid of substantially parallel conductors supported in a dielectric skin;
    a second grid of substantially parallel conductors supported in a dielectric skin and substantially identical to said first grid;
    and means having a dielectric constant lower than that of said skins for spacing said first and second grids approximately one-quarter of the effective operating wavelength apart;
    said group of conductors being so constructed and arranged that an incident wave which is linearly polarized parallel to the conductors will be transmitted through the device with a quarter wave phase advance compared to a perpendicularly polarized wave.

12. A polarization sensitive device for operating over a predetermined band of frequencies comprising:
    a first grid of substantially parallel conductors supported in a dielectric skin;
    a second grid of substantially parallel conductors supported in a dielectric skin and substantially identical to said first grid;
    and means having a dielectric constant lower than that of said skins for spacing said first and second grids approximately one-quarter of the effective operating wavelength apart;
    the entire device being so constructed and arranged that an incident wave which is linearly polarized parallel to the conductors will be transmitted through the device with a quarter wave phase advance compared to a perpendicularly polarized wave;
    whereby the device is effective to convert right-hand circularly polarized waves to horizontally polarized waves and vice versa, and to convert left-hand circularly polarized waves to vertically polarized waves and vice versa.

13. A double-reflector, double-feed antenna comprising:
    main reflector means, for reflecting an incident wave of a first circular polarization as a wave of first linear polarization and reflecting an incident wave of the opposite circular polarization as a wave of a second linear polarization, and vice versa, over a wide range of frequency and incidence angle, comprising;
      (a) a reflecting surface for electromagnetic waves;
      (b) a grid of parallel thin metallic wires having a diameter and spacing such that approximately 83.6% of the power of an incident wave polarized parallel to the wires passes through;
      (c) a thin dielectric skin enclosing said wires;
      (d) and a low dielectric constant material supporting said dielectric skin with a spacing of approximately 27.4% of the effective operating wavelength between the wires and the reflecting surface;
    subreflector means cooperating with said main reflector for transmitting waves of said first linear polarization and reflecting waves of said second linear polarization;
    first feed means position for processing said transmitted waves;
    and second feed means position for processing said reflected waves.

References Cited by the Examiner
UNITED STATES PATENTS
1,938,066  12/1933  Darbord _____ 343—756 X
2,788,440   4/1957  Ramsay et al. _____ 343—756 X (Other references on following page)

UNITED STATES PATENTS

| | | | |
|---|---|---|---|
| 2,814,724 | 11/1957 | Culshaw | 343—100 |
| 2,930,039 | 3/1960 | Ruze | 343—909 X |
| 3,137,000 | 6/1964 | Fuller | 343—909 X |
| 3,195,137 | 7/1965 | Jakes | 343—781 |

FOREIGN PATENTS 562,602  9/1958  Canada.

HERMAN KARL SAALBACH, *Primary Examiner.*
CHESTER L. JUSTUS, *Examiner.*
M. KRAUS, E. LIEBERMAN, *Assistant Examiners.*